United States Patent
Meng et al.

(10) Patent No.: US 10,027,641 B2
(45) Date of Patent: Jul. 17, 2018

(54) METHOD AND APPARATUS OF ACCOUNT LOGIN

(71) Applicant: Alibaba Group Holding Limited, Grand Cayman (KY)

(72) Inventors: Chao Feng Meng, Hangzhou (CN); Xiaowei Chen, Hangzhou (CN); Lingyun Chen, Hangzhou (CN); Yan Xia, Hangzhou (CN); Mingxing Xu, Hangzhou (CN); Lei Wang, Hangzhou (CN); Feng Zhu, Hangzhou (CN); Ji Xu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 233 days.

(21) Appl. No.: 14/095,846

(22) Filed: Dec. 3, 2013

(65) Prior Publication Data

US 2014/0165171 A1   Jun. 12, 2014

(30) Foreign Application Priority Data

Dec. 6, 2012   (CN) .......................... 2012 1 0521715

(51) Int. Cl.
*H04L 29/06* (2006.01)
*G06F 21/31* (2013.01)
(Continued)

(52) U.S. Cl.
CPC .............. *H04L 63/08* (2013.01); *G06F 21/31* (2013.01); *G06F 21/36* (2013.01);
(Continued)

(58) Field of Classification Search
CPC ............ H04L 9/00; H04L 9/32–9/3297; H04L 63/04–63/0892; G06F 15/16;
(Continued)

(56) References Cited

U.S. PATENT DOCUMENTS 6,311,214 B1   10/2001   Rhoads
7,444,392 B2   10/2008   Rhoads et al.
(Continued)

FOREIGN PATENT DOCUMENTS

CN   101627393   1/2010

OTHER PUBLICATIONS

PCT Search Report and Written Opinion dated Feb. 24, 2014 for PCT Application # PCT/US13/72896.
(Continued)

*Primary Examiner* — Ashok Patel
*Assistant Examiner* — Quazi Farooqui
(74) *Attorney, Agent, or Firm* — Lee & Hayes, PLLC

(57) ABSTRACT

The present disclosure discloses a method and an apparatus of account login to solve the problem of low efficiency of account login in existing technologies. A client of the method captures an image of a first credential of a user, recognizes user information of the user that is included in the captured image, includes the recognized user information into a login request, and sends the login request to a server for logging into an account that corresponds to the user information. Through this method, a user does not need to input his/her username when using a client for account login, but perform the account login by directly capturing an image of a first credential using an image capturing device of the client, thus effectively improving the efficiency of account login.

20 Claims, 10 Drawing Sheets

(51) Int. Cl.
*G06F 21/36* (2013.01)
*G07C 9/00* (2006.01)
*G06K 9/00* (2006.01)

(52) U.S. Cl.
CPC ........ *G07C 9/00039* (2013.01); *H04L 63/083* (2013.01); *G06K 9/00449* (2013.01)

(58) Field of Classification Search
CPC ....... G06F 21/30–21/46; G06F 21/60–21/645; G06F 9/00; H04M 1/66; G07C 9/00039; G06K 9/00449
USPC ..... 713/168–174, 182–186, 202, 1; 726/2–8, 726/18
See application file for complete search history.

(56) References Cited

U.S. PATENT DOCUMENTS

| | | | |
|---|---|---|---|
| 2008/0155095 | A1 | 6/2008 | Yamaguchi |
| 2009/0153293 | A1 | 6/2009 | Chou |
| 2010/0031328 | A1* | 2/2010 | Hodgkinson ........... G06F 21/33 726/5 |
| 2010/0043062 | A1* | 2/2010 | Alexander et al. ............... 726/6 |
| 2010/0121737 | A1 | 5/2010 | Yoshida |
| 2012/0005483 | A1 | 1/2012 | Patvarczki et al. |
| 2012/0023574 | A1 | 1/2012 | Osborn et al. |
| 2012/0292388 | A1* | 11/2012 | Hernandez ........... G06Q 20/108 235/379 |
| 2012/0331549 | A1 | 12/2012 | Gunnewig et al. |
| 2013/0104205 | A1 | 4/2013 | Hsi |
| 2013/0185293 | A1* | 7/2013 | Boback ............... G06F 17/3053 707/728 |
| 2013/0254856 | A1* | 9/2013 | Krishan ........................... 726/6 |
| 2013/0326605 | A1* | 12/2013 | Betz ....................... G06F 21/31 726/7 |
| 2013/0340057 | A1* | 12/2013 | Kitlyar .................... G06F 21/36 726/6 |
| 2014/0007224 | A1 | 1/2014 | Lu et al. |

OTHER PUBLICATIONS

Translated Chinese Office Action for Chinese Application No. 2012105217152, dated Jun. 2, 2016, 20 pages.

* cited by examiner

METHOD AND APPARATUS OF ACCOUNT LOGIN

CROSS REFERENCE TO RELATED PATENT APPLICATION

This application claims foreign priority to Chinese Patent Application No. 201210521715.2 filed on Dec. 6, 2012, entitled "Method and Apparatus of Account Login", which is hereby incorporated by reference in its entirety.

TECHNICAL FIELD

The present disclosure relates to a field of communication technology, and more particularly, relates to methods and apparatuses of account login.

BACKGROUND

In existing technologies, a user usually first enters his/her username and password when accessing an online service in order to log into an account of the user that corresponds to the online service for accessing the corresponding online service.

For example, when conducting an online service, such as shopping online, or communicating with others via instant messaging software, or receiving/sending electronic mails via an online mailbox, a user is needed to enter a corresponding username and password to log into a corresponding account for obtaining a corresponding online service.

Moreover, if a user wants to obtain a certain online service but does not have a corresponding account for that online service, the user may register an account corresponding to that online service. During account registration, the user may set up a username and a password for the account to be registered, and use that user name and password for future logins upon successful registration.

However, due to the increasing diversification of online services, a user will need to register one account for every single online service he/she needs, and therefore will need to remember usernames and passwords used by accounts corresponding to each online service. Apparently, along with the diversified development of the online services, a user may easily forget the usernames and the passwords that are used by his/her registered accounts. Once forgotten, the user will have to retrieve the user names and passwords through tedious procedures, thus undoubtedly reducing the efficiency of user account login.

Furthermore, different types of smart mobile devices have been popularly used recently. Other than using a conventional personal computer (PC) for account login, a user may also log into an account using a smart mobile device, such as a smartphone, a tablet, etc. However, because of the miniaturization of smart mobile devices, there exists inconvenience for a user to enter a user name and a password through a smart mobile device, thus further reducing the efficiency of the user account login.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The embodiments of the present disclosure provide a method and an apparatus of account login in order to overcome the problem of low efficiency of account login in existing technologies.

The embodiments of the present disclosure provide a method of account login, which includes:
capturing, by a client, an image of a first credential of a user;
recognizing user information of the user that is included in the captured image; and
including the recognized user information into a login request, and sending the login request to a server for logging into an account that corresponds to the user information.

The embodiments of the present disclosure provide a method of account login, which includes:
receiving, by a server, a login request that includes user information from a client, where the user information contained in the login request includes user information recognized from an image of a first credential of a user that is captured by the client;
searching for an account that corresponds to the user information based on the user information contained in the login request and a stored correspondence relationship between user information and accounts; and
responding to the login request to enable the client to log into the account corresponding to the user information.

The embodiments of the present disclosure provide an apparatus of account login, which includes:
a collection module used for capturing an image of a first credential of a user;
a recognition module used for recognizing user information that is contained in the captured image; and
a login module used for including the recognized user information into a login request, and sending the login request to a server for logging into an account that corresponds to the user information.

The embodiments of the present disclosure provide an apparatus of account login, which includes:
a receiving module used for receiving a login request that includes user information from a client, where the user information contained in the login request includes user information recognized from an image of a first credential of a user that is captured by the client;
a searching module used for searching for an account that corresponds to the user information based on the user information contained in the login request and a stored correspondence relationship between user information and accounts; and
a feedback module used for responding to the login request to enable the client to log into the account corresponding to the user information.

The embodiments of the present disclosure provide a method and an apparatus of account login. A client of the method captures an image of a first credential of a user, recognizes user information of the user that is included in the captured image, includes the recognized user information into a login request, and sends the login request to a server for logging into an account that corresponds to the user information. Through this method, a user does not need to input his/her username when using a client for account login, but perform the account login by directly capturing an image of a first credential using an image capturing device of the client, thus effectively improving the efficiency of account login.

DETAILED DESCRIPTION

In order to improve the efficiency of account login, rather than adopting a conventional method of account login by inputting a username and a password through a client, the embodiments of the present disclosure capture an image of a first credential of a user through a client, recognize user information of the user that is included in the captured image, and log into an account corresponding to the user information based on the recognized user information.

The embodiments of the present disclosure will be described below in detail with reference to the accompanying figures of the present disclosure.

Figure 1:
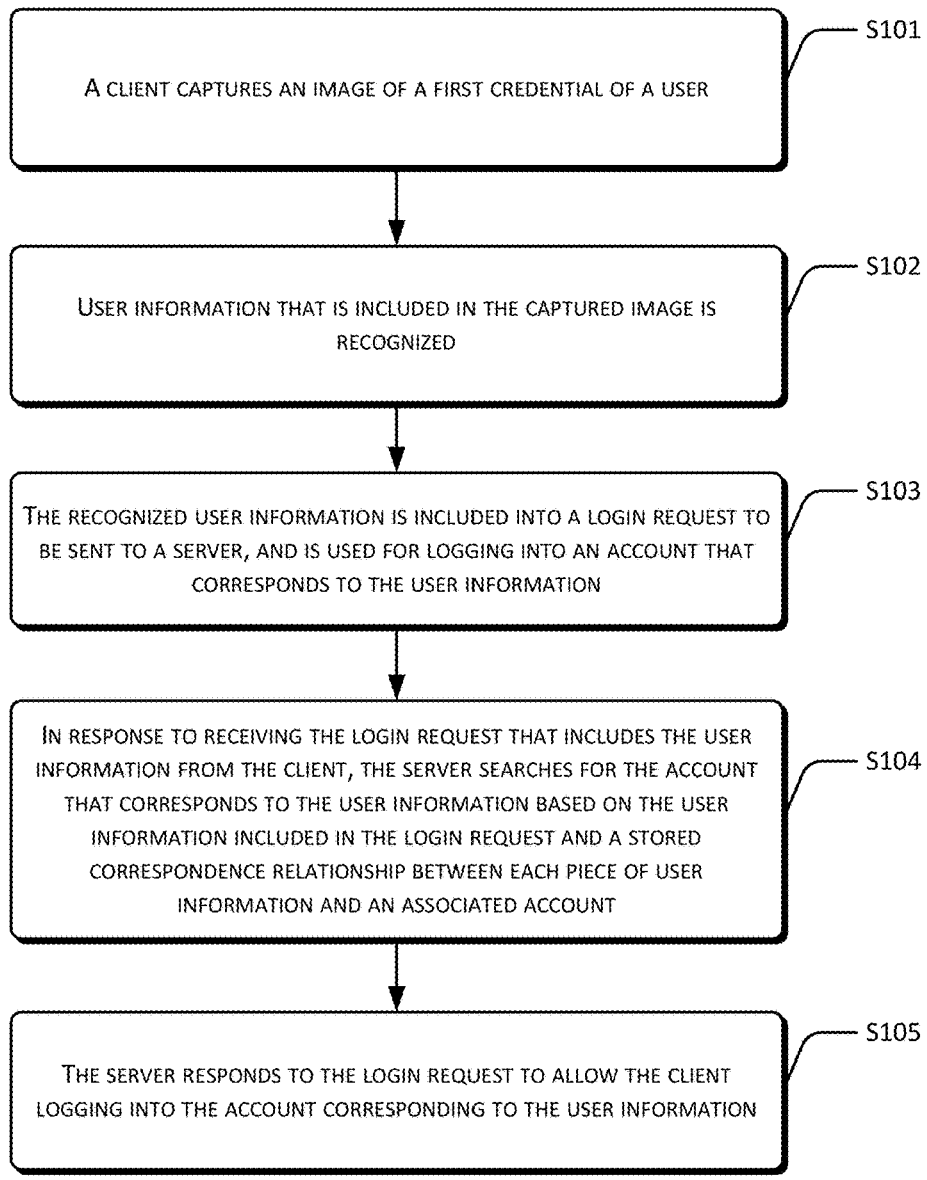
FIG. 1 is a flowchart illustrating a process of account login in accordance with the embodiments of the present disclosure.

FIG. 1 is a flowchart illustrating a process of account login in accordance with the embodiments of the present disclosure, which includes the following:

S101: A client captures an image of a first credential of a user.

In embodiments of the present disclosure, an image of a first credential of a user is first captured by terminal client when the user employs the client for account login. The client in the embodiments of the present disclosure may include, but is not limited to, a mobile device and a PC. When a user employs a PC to log into an account, an image of a first credential may be captured by an image capturing device such as an externally installed camera of the PC. When the user employs a mobile device (such as a mobile phone or a PC tablet) for account login, the image of the first credential may be captured by an image capturing device such as a camera of the mobile device.

Specifically, the first credential may be an identification card of the user. When the user is in a process of logging in an account, an image of the identification card of the user may be captured by the client. Preferably, when the first credential is an identification card, the client may capture a front image and a back image of the identification card of the user.

S102: User information that is included in the captured image is recognized.

In response to capturing the image of the first credential at S101, the client may recognize user information that is included in the captured image through Optical Character Recognition (OCR) technology.

Specifically, when the captured image of the first credential is an image of the identification card of the user at S101, the client employs the OCR technology to recognize at least one of name information and identification card number information of the user that is included in the captured image as recognized user information of the user.

For example, when the client captures the front image and the back image of the identification card of the user at S101, the client may recognize, from the captured front image of the identification card, information of name, sex, nationality, date of birth, address and identification card number of the user, and may recognize, from the captured back image of the identification card, information of an issuing authority and an expiration date of the identification card. As such, the client may recognize at least one or more pieces of the above information from the captured front image and back image of the identification card as recognized user information of the user.

S103: The recognized user information is included into a login request to be sent to a server, and is used for logging into an account that corresponds to the user information.

After recognizing the user information from the captured image, the client may include the recognized user information into a login request and send the login request to a server for logging into an account that corresponds to the user information.

S104: In response to receiving the login request that includes the user information from the client, the server searches for the account that corresponds to the user information based on the user information included in the login request and a stored correspondence relationship between each piece of user information and an associated account.

In the embodiments of the present disclosure, the server stores a correspondence relationship between each piece of user information and an associated account, and may specifically store a correspondence relationship between a piece of user information and an identity or ID of an associated account. One piece of user information corresponds only to one account, and one account corresponding only to one piece of user information. In other words, one piece of user information can only be used to log into one account.

S105: The server responds to the login request to allow the client to log into the account corresponding to the user information.

Upon finding the account that corresponds to the user information included in the login request, the server responds to the login request for allowing the client to log into the account corresponding to the user information.

Recently, a camera has been one of the standard features of smart mobile devices such as a smartphone or a PC tablet, and an external camera is also commonly installed in a PC. Therefore, when logging to an account using a client, a user may utilize the above method to directly capture an image of a first credential of the user through the client. The client may recognize user information of the user included in the image and log into an account corresponding to the user information based on the recognized user information, thus saving the user from a tedious process of entering a username. This is especially true when a user uses a miniaturized smart mobile device for account login, the user only needs to capture an image of a first credential using the client, thus effectively improving the efficiency of account login of the user.

In the embodiments of the present disclosure, in order to improve the security associated with the account, the user further needs to enter a corresponding password when logging into the account using the method of FIG. 1. Specifically, before including the recognized user information into the login request for sending to the server at S103, the client may instruct the user to enter a password. After the user enters the password, the user information that is recognized in S102 and the password that is entered by the user may be included into the login request for sending to the server. Correspondingly, the server stores not only the correspondence relationship between each piece of user information and the associated account, but also a password used for each account. In response to receiving the login request that contains the user information and the password, the server may authenticate the user information and the password included in the login request, and respond to the login request for allowing the client to log into the account corresponding to the user information upon successful authentication.

A method of authenticating user information and a password that are included in a login request by the server may include: the server determining a stored password used by an account corresponding to the user information that is included in the login request, determining whether the password included in the login request matches the stored password corresponding to the user information, passing authentication and responding to the login request if matched, and failing to pass the authentication and disallowing the client to log into the account corresponding to the user information.

Figure 2:
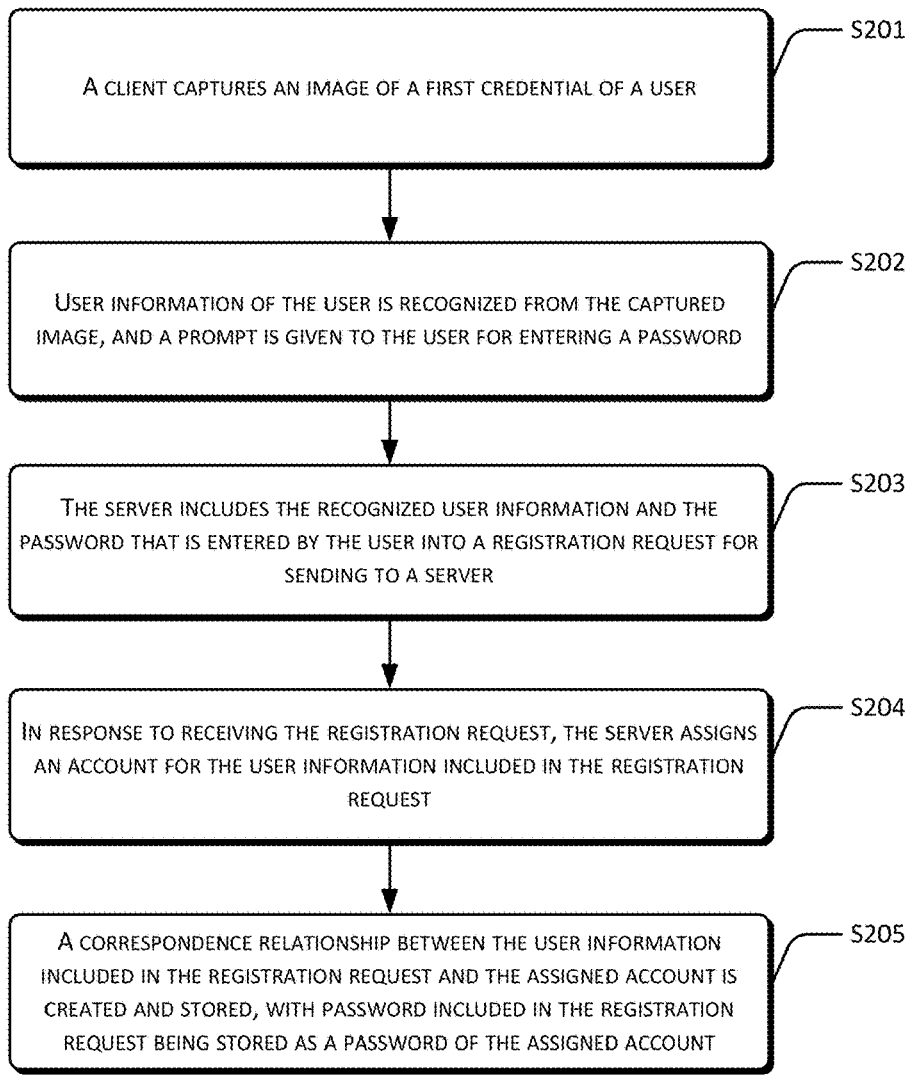
FIG. 2 is a flowchart illustrating a process of account registration in accordance with the embodiments of the present disclosure.

Furthermore, in embodiments of the present disclosure, with respect to the account corresponding to the user information as described above, the server completes storing the account corresponding to the user information and the password used for the account when the user registers that account as shown in FIG. 2. FIG. 2 is a flowchart illustrating a process of account registration in accordance with the embodiments of the present disclosure, which includes:

S201: A client captures an image of a first credential of a user.

In the embodiments of the present disclosure, when a user registers an account, the user also employs a client to capture an image of a first credential thereof to specify user information used by the account to be registered. Similarly, the first credential may be an identification card of the user.

S202: User information of the user is recognized from the captured image, and a prompt is given to the user for entering a password.

Similarly, the client employs the OCR technology to recognize the user information from the captured image of the user. If the first credential is an identification card, at least one of name information or identification card number information is recognized from the captured image as recognized user information. Furthermore, in order to ensure the security of the account, the client may prompt the user to enter a password for an account to be registered.

S203: The server includes the recognized user information and the password that is entered by the user into a registration request for sending to a server.

After the user information is recognized and the user sets up the password, the client includes the recognized user information and the set password in a registration request for sending to a server in order to register an account.

S204: In response to receiving the registration request, the server assigns an account for the user information included in the registration request.

The server may assign an account ID for the user information included in the registration request.

S205: A correspondence relationship between the user information included in the registration request and the assigned account is created and stored. The password included in the registration request is stored as a password of the assigned account.

The account registration is successfully completed at this moment. Subsequently, when the user wants to log into the account, the user may use a client to capture an image of a first credential (i.e., the same first credential used during the account registration) using the client through the method of FIG. 1, and input a password to log into the account.

Furthermore, in order to improve the security of the account, the client may further include a client identifier in the registration request for sending to the server at S203 of the process of account registration shown in FIG. 2. Upon receiving the registration request at S205, the server creates not only the correspondence relationship between the user information included in the registration request and the assigned account, but also a correspondence relationship between the assigned account and the client identifier that is included in the registration request.

Correspondingly, when performing an account login as shown in the process of FIG. 1, the client also includes user information (i.e., user information recognized from the image of the first credential), a password entered by the user, and a client identifier in a login request for sending to the sever. After receiving the login request, the server searches for an account that corresponds to the user information included in the login request and determines whether a stored client identifier corresponding to the account matches the client identifier included in the login request and whether a password used for that account matches the password included in the login request. If both are matched, an authentication is passed and the server responds to the login request, allowing the client to log into the account that corresponds to the user information. If at least one of them is not matched, the authentication fails and the client is denied to log into the account corresponding to the user information.

After finding the account corresponding to the user information included in the login request, the server may determine that the authentication is passed and allow the client to log into the account when verifying that the password included in the login request and the stored password used by the account are the same but that the client identifier included in the login request and the client identifier corresponding to the account are not the same. The server may update the stored client identifier corresponding to the account at that time, i.e., updating the stored client identifier corresponding to the account to be the client identifier included in the login request.

In at least one embodiment, the client may first send a client identifier thereof to the server. After the server finds an account corresponding to the client identifier, the client may then include the user information and the password entered by the user in the login request for sending to the server. The server verifies whether the user information included in the login request is the same as user information corresponding to the found account and whether the password included in the login request is the same as the password used by the found account. If the authentication is passed, the client is allowed to log in. Otherwise, the login is denied.

If the above client is a smart mobile device, the client identifier of the client includes, but is not limited to, a phone number, an International Mobile Subscriber Identification (i.e., IMSI) of the client. When the client identifier is a phone number, a method of sending the client identifier from the client to the server may include sending a message to the server. In a process of account login by the client, interfaces of the client may be illustrated in FIG. 3A-FIG. 3D.

Figure 3A:
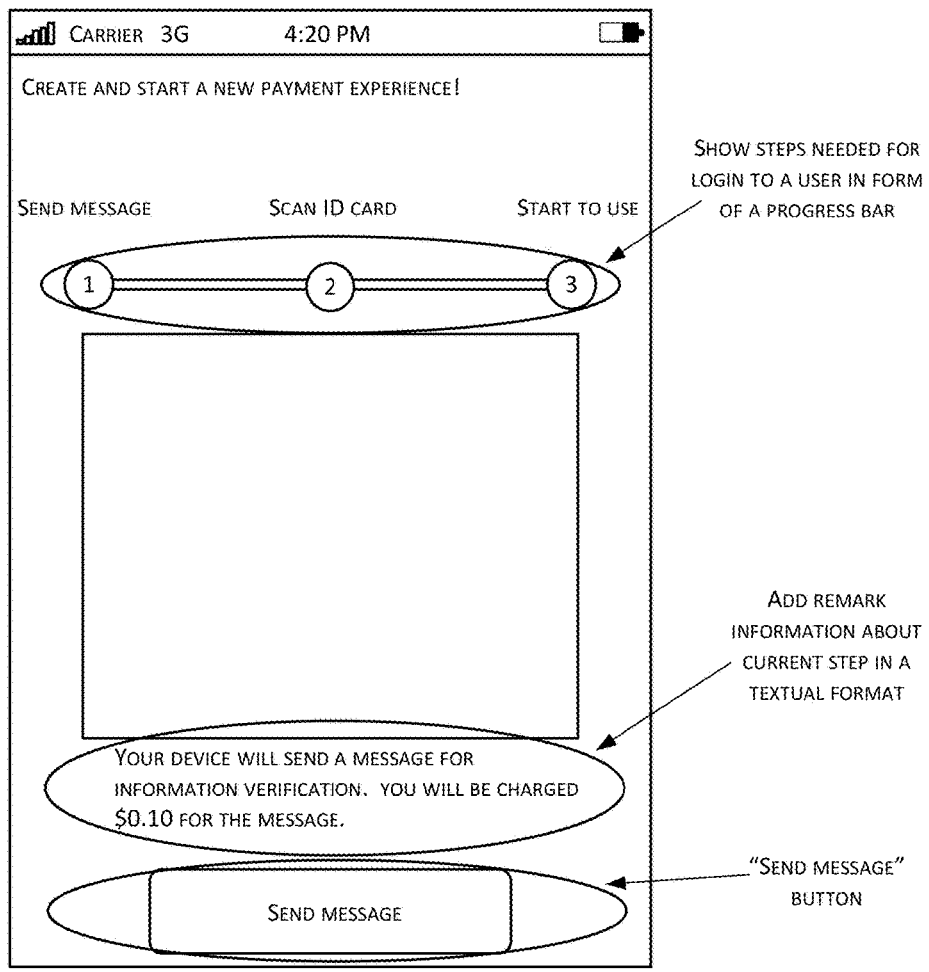
FIG. 3A is a schematic diagram illustrating an interface when a client sends a message to a server in accordance with the embodiments of the present disclosure.

FIG. 3A is a schematic diagram illustrating an interface when a client sends a message to a server in accordance with the embodiments of the present disclosure. During the process of account login by a user through a client as shown in FIG. 3A, an interface of the client provides information about steps needed in the login process to the user in a form of a progress bar, and may further provide remark information of a current step in a textual format. Since the client needs to send a short message to the server during the process of account login shown in FIG. 3, a "Send Message" button is set up in the interface as shown in FIG. 3A. The client is configured to send a message to the server upon clicking the button. After receiving the message, the server obtains a client identifier of the client, i.e., the phone number.

Figure 3B:
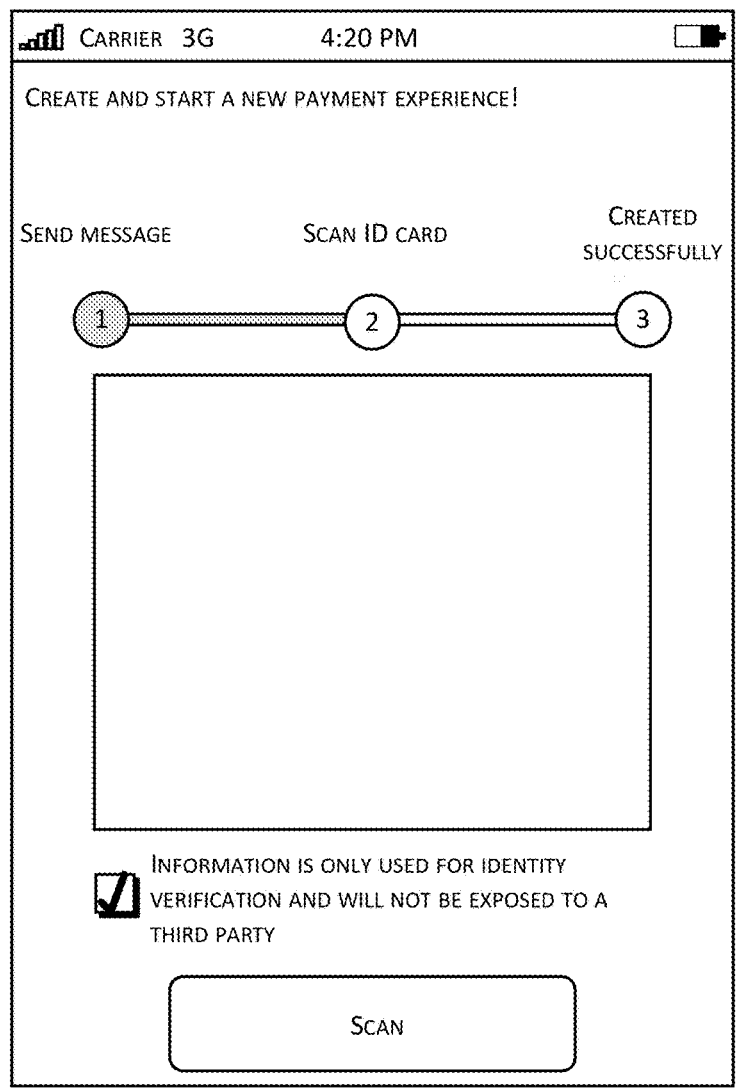
FIG. 3B is a schematic diagram illustrating an interface when a client captures an image in accordance with the embodiments of the present disclosure.

FIG. 3B is a schematic diagram illustrating an interface when the client captures an image in accordance with the embodiments of the present disclosure. As shown in FIG. 3B, a "Scan" button is set up in the interface. An image of a first credential is captured after this button is clicked.

Figure 3C:
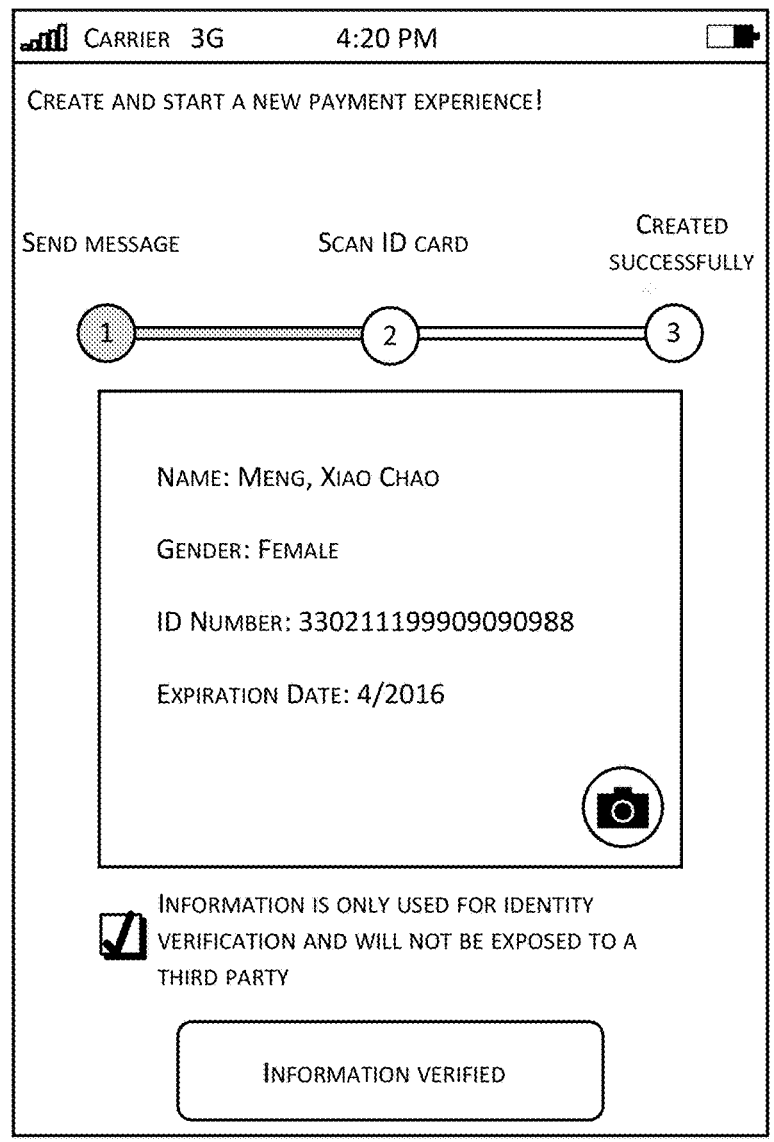
FIG. 3C is a schematic diagram illustrating an interface after a client captures an image in accordance with the embodiments of the present disclosure.

FIG. 3C is a schematic diagram illustrating an interface after the client captures the image in accordance with the embodiments of the present disclosure. As shown in FIG. 3C, the interface displays user information that is recognized from the captured image of the first credential for user confirmation. If the user confirms that the recognized user information is correct, the user may click on an "Information Confirmed" button in the interface, and the user information will be included into a login request to be sent to the server. If the user finds that the recognized user information is wrong, the user may click on a "Recapture" button in the interface to capture an image of the first credential and identify user information again.

Figure 3D:
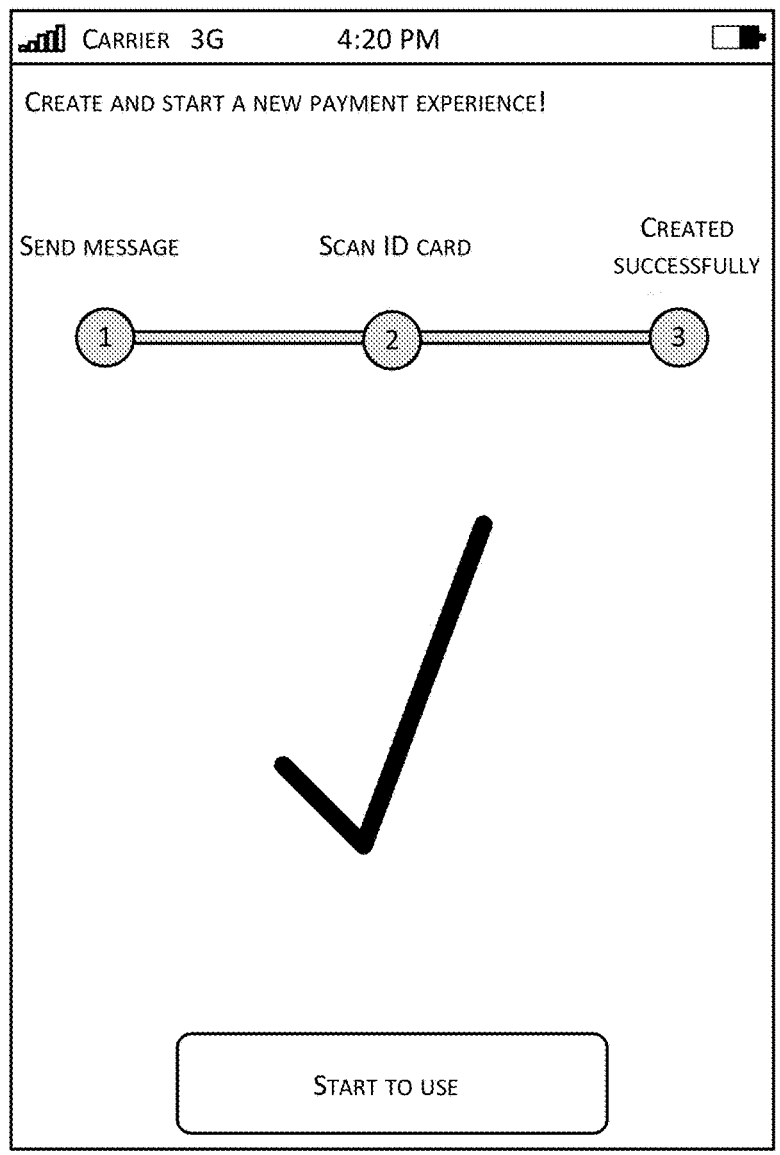
FIG. 3D is a schematic diagram illustrating an interface when a client sends a login request to a server in accordance with the embodiments of the present disclosure.

FIG. 3D is a schematic diagram illustrating an interface after the client sends a login request to the server in accordance with the embodiments of the present disclosure. As shown in FIG. 3D, after the client sends a login request that contains user information to the server and the server passes authentication, the interface sets up a "Start" button. By clicking that button, the interface changes to an account interface to obtain a corresponding online service.

Furthermore, in order to improve the security of an account, during the account registration using the method as shown in FIG. 2, the captured image of the first credential may also be included into the registration request for delivering to the server in addition to including the user information that is recognized from the captured image of the first credential and the password that is entered by the user into the registration request for delivering to the server. The server creates the correspondence relationship between the assigned account and the user information included in the registration request, a correspondence relationship between the assigned account and the image included in the registration request, and stores the password included in the registration request as the password used for the assigned account.

Correspondingly, after capturing the image of the first credential using the account login method as shown in FIG. 1, in addition to including the user information that is recognized from the image of the first credential and the password that is entered by the user are into the login request for sending to the server, the client further includes the image of the first credential in the login request for sending to the server. After receiving the login request, the server finds an account that corresponds to the user information included in the login request, determines whether the password included in the login request matches the stored password used for the account, and determines whether a degree of similarity between the image included in the login request and the stored image corresponding to the account is larger than a predetermined threshold value. If corresponding determination results are affirmative, the authentication is passed and the server responds to the login request to allow the client to log into the account corresponding to the user information. Otherwise, the authentication fails and the client is disallowed to log into the account.

Furthermore, in order to maximally protect the privacy of a user, a method of storing user information and a password by the server during the process of account registration as shown in FIG. 2 may include: encrypting user information and a password that are included in a received registration request to obtain encrypted user information and an encrypted password, creating and storing a correspondence relationship between an assigned account and the encrypted user information, and storing the encrypted password as a password used for the assigned account.

When encrypting user information and a password, the user information and the password may be encrypted based on an irreversible encryption algorithm, i.e., adopting an undecryptable encryption algorithm to obtain encrypted user information and an encrypted password. Hereinafter, unencrypted user information is referred to as plaintext user information, unencrypted password is referred to as a plaintext password, encrypted user information is referred to as ciphertext user information, and an encrypted password is referred to as a ciphertext password.

If the server does not encrypt user information and passwords when storage, the server will store plaintext user information and plaintext passwords used by users during account registration. In this case, if the server suffers a malicious attack, the user information and the password will easily be leaked out, seriously affecting the security of the user privacy. However, after adopting an irreversible encrypting algorithm for encryption, what are stored in the server are ciphertext user information and ciphertext passwords. Therefore, even if the server is suffered from a malicious attack and leaks out the ciphertext user information and the ciphertext passwords, the ciphertext user information and the ciphertext passwords cannot be able to be read directly and decrypted, thus effectively protecting the privacy of the users.

Correspondingly, if the server stores ciphertext user information and ciphertext passwords, after receiving a login request that includes plaintext user information and a plaintext password using the account login method as shown in FIG. 1, the server may encrypt the plaintext user information and the plaintext password included in the login request using an irreversible encrypting algorithm (which is the same as the encryption algorithm used during account registration) to obtain ciphertext user information and a ciphertext password. The server then finds an account corresponding to the ciphertext user information, and verifies whether the obtained ciphertext password matches a stored ciphertext password used for the account. If verification is passed, the client is allowed to log into the account.

In embodiments of the present disclosure, in order to improve the security of an account, certain designated operations may be set up based on actual needs. When a user performs these designated operations, the client captures an image of a second credential of the user, recognizes verification information included in the captured image of the second credential, and includes user information recognized from an image of a first credential and the verification information recognized from the image of the second cert credential in a request message corresponding to a designated operation for sending to the server. After receiving the request message, the server performs authentication for the user information and the verification information that are included in the request message, responds to the request message to allow the client to perform related procedure associated with that designated operation upon successful authentication.

The designated operation may be set as a password reset operation, or can be set as any other kinds of operations. For example, after a user logs in an account and frequently requests the same operation from the server, such frequently requested operation may be set as a designated operation. Alternatively, when using the account login method as shown in FIG. 1, if a client that a user currently uses for logging into an account is different from a client that is previously used for logging into this account, or if a current security level for the account of the user is relatively low, operation(s) performed by the user for the current account login may be set as a designated operation.

The following uses a password reset operation as an example of the designated operation for illustration.

After setting up a password for a registered account, a user may forget his/her password that is set. Methods of recovering and resetting a password in existing technologies usually include such methods as message verification, email recovery, password hint, etc., with a tedious procedure of password reset and a relatively low efficiency.

As such, based on a similar concept of account login and account registration described in the foregoing, embodiments of the present disclosure provide a method of password reset in order to improve the efficiency for password reset, which includes: capturing an image of a second credential of a user when the user employs a client to perform a password reset operation; recognizing verification information that is contained in the image captured from the second credential; including user information recognized from an image of a first credential and the verification information recognized from the image of the second credential into a password reset request (i.e., a request message corresponding to the password reset operation) for delivering to the server; performing a related password reset procedure upon successful authentication of the user information and the verification information contained in the password reset request by the server.

A user may perform a password reset operation after successfully logging into an account using the method shown in FIG. 1, or after failing to log into the account using the method shown in FIG. 1. If a password is forgotten, the user may employ the client to capture an image of a first credential by the method shown in FIG. 1 but enter a wrong password. After the client includes user information recognized from the image of the first credential and the wrong password into a login request for sending to the server, the server will deny the client from logging into an account. At that time, the user may initialize a password reset operation.

Since the image of the first credential has been captured and the user information has been recognized therefrom, the client may prompt the user to capture an image of a second credential using the client after the user initializes the password reset, recognize verification information of the second credential, and include the user information and the verification information into a password reset request for sending to the server. After the server successfully authenticates the user information and the verification information, a related password reset procedure may be performed subsequently.

Furthermore, the second credential may be a bank card of the user. When the user performs the password reset operation, the client captures an image of the bank card of the user and recognizes bank card number information that is contained in the captured image of the bank card as verification information. At that time, the client may include user information (i.e., information of a name and an identification card number of the user) and the verification information (i.e., the bank card number information) into a password reset request for sending to the server.

After receiving the password reset request, a method of authenticating the user information and the verification information contained in the password reset request by the server may include: verifying whether a name corresponding to the bank card number of the verification information and the name contained in the password reset request are the same, and whether an identification card number corresponding to the bank card number and the identification card number contained in the password reset request are the same by communicating with a banking system, passing authentication and responding to the password reset request to allow the client to perform a related password reset procedure if both are the same, or failing the authentication and denying the password reset request if otherwise.

In at least one embodiment, other authentication methods for further authenticating the user information and the verification information that are contained in the password reset request may additionally be used on top of the above authentication method.

For example, if the client used by the user is a smartphone and if the server has successfully verified that the user name corresponding to the bank card number of the verification information is the name contained in the password reset request and that the identification card number corresponding to the bank card number is the identification card number contained in the password reset request, the server may further instruct, through communication with the banking system, the banking system to send a verification message to a designated phone number corresponding to the bank card number contained in the password reset request (the verification message contains a verification code), and sends a request for obtaining the verification code to the client (i.e., the smartphone). The client prompts the user to enter the verification code, and sends the verification code that is entered by the user to the server. The server then sends the received verification code to the banking system. The banking system compares the verification code contained in the sent verification message with the verification code sent from the server, and will return a comparison result to the server. If the server receives a comparison result indicating that they are the same, showing that the phone number of the currently used client (i.e., the smartphone) is the same as the designated phone number corresponding to the bank card number, the authentication is passed. If the phone number of the currently used client (i.e., the smartphone) is not the same as the designated phone number corresponding to the bank card number, then the authentication fails.

The above examples of using an identification card as a first credential and a bank card as a second credential are used merely for explaining the account login methods provided in the embodiments of the present disclosure. Based on the above account login methods provided in the embodiments of the present disclosure, a credential such as an identification card, a bank card, a passport, or a driving license, etc., may be used as a first credential or a second credential in the above method and can achieve the same effect.

Furthermore, the example methods log into an account by capturing an image using a client. Based on a similar concept, when registering an account, a user may capture other images for registration using the client, for example, capturing an image of his/her business card, or even an image of a specific scene. The server creates a correspondence relationship between an assigned account and an image (which is included in a registration request) sent from the client. When logging into an account using a client, a corresponding account may be logged in as long as the image that is captured during the account registration process can be captured.

The foregoing corresponds to account login methods provided in the embodiments of the present disclosure. Based on a similar concept, the present disclosure further provides apparatuses of account login as shown in FIG. 4 and FIG. 5.

Figure 4:
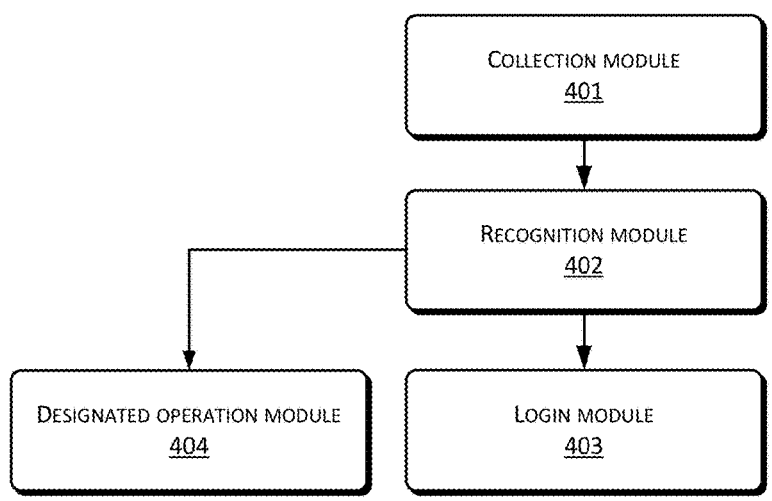
FIG. 4 is a structural diagram illustrating an apparatus of account login in accordance with the embodiments of the present disclosure.
Figure 5:
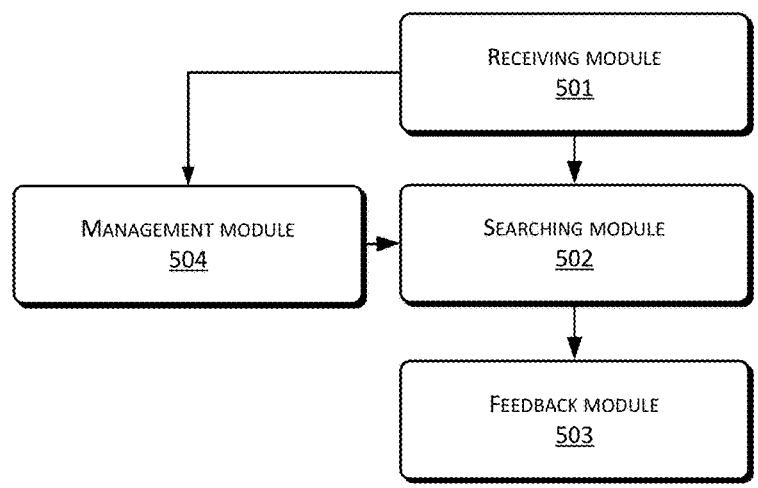
FIG. 5 is a structural diagram illustrating another apparatus of account login in accordance with the embodiments of the present disclosure.

FIG. 4 is a structural diagram illustrating an apparatus of an account login in accordance with the embodiments of the present disclosure, which includes:

a collection module 401 used for capturing an image of a first credential of a user;

a recognition module 402 used for recognizing user information that is contained in the captured image; and a login module 403 used for including the recognized user information into a login request, and sending the login request to a server for logging into an account that corresponds to the user information.

The collection module 401 is used for capturing an image of an identification card of the user.

The recognition module 402 is used for recognizing at least one of name information and identification card number information of the user that is included in the captured image.

The login module 403 is used for including the recognized user information and a password that is entered by the user into a login request for sending to the server, and logging into the account that corresponds to the user information upon successful authentication by the server based on the user information and the password included in the login request, where the server stores a correspondence relationship between the user information and the account, and an associated password used for each account.

The collection module 401 is further used for capturing an image of a second credential of the user when the user performs a designated operation, where the designated operation includes a password reset operation.

The recognition module 402 is further used for recognizing verification information that is included in the image captured from the second credential.

The apparatus further includes:

a designated operation module 404 used for including the user information recognized from the image of the first credential and the verification information recognized from the image of the second credential into a request message that corresponds to the designated operation for sending to the server, and performing a related procedure corresponding to the designated operation upon successful authentication by the server based on the user information and the verification information included in the request message.

The collection module 401 is used for capturing an image of a bank card of the user.

The recognition module 402 is used for recognizing bank card number information included in the captured image of the second credential.

The apparatus of account login as shown in FIG. 4 above may be located in a client.

FIG. 5 is a structural diagram illustrating another apparatus of account login in accordance with the embodiments of the present disclosure, which includes:

a receiving module 501 used for receiving a login request that includes user information from a client, where the user information contained in the login request includes user information recognized from an image of a first credential of a user that is captured by the client;

a searching module 502 used for searching for an account that corresponds to the user information based on the user information contained in the login request and a stored correspondence relationship between pieces of user information and accounts; and a feedback module 503 used for responding to the login request to enable the client to log into the account corresponding to the user information.

The receiving module 501 is used for receiving the login request that includes the user information and a password from the client, where the password is entered by the user through the client.

The feedback module 503 is further used for, prior to responding to the login request, determining a stored password used for the account corresponding to the user information, and determining whether the password includes in the login request matches the stored password used for the account corresponding to the user information.

The receiving module 501 is further used for receiving a registration request that includes user information and a password from the client, where the user information included in the registration request is the user information that is recognized from the image captured from the first credential of the user, and the password included in the registration request is entered by the user through the client.

The apparatus further includes:

a management module 504 used for assigning an account for the user information included in the registration request, creating and storing a correspondence relationship between the user information included in the registration request and the assigned account, and storing the password included in the registration request as a password used for the assigned account.

The receiving module 501 is further used for receiving, from the client, a request message that includes the user information and verification information and corresponds to a designated operation, where the verification information included in the request message is verification information recognized from a captured image of a second credential of the user, and the designated operation includes a password reset operation.

The feedback module 503 is further used for, when the receiving module 501 receives the request message from the client, performing authentication based on the user information and the verification information, and upon successful authentication, responding to the request message to allow the client to perform a related procedure corresponding to the designated operation.

The apparatus of account login as shown in FIG. 5 above may be located in a server.

Figure 6:
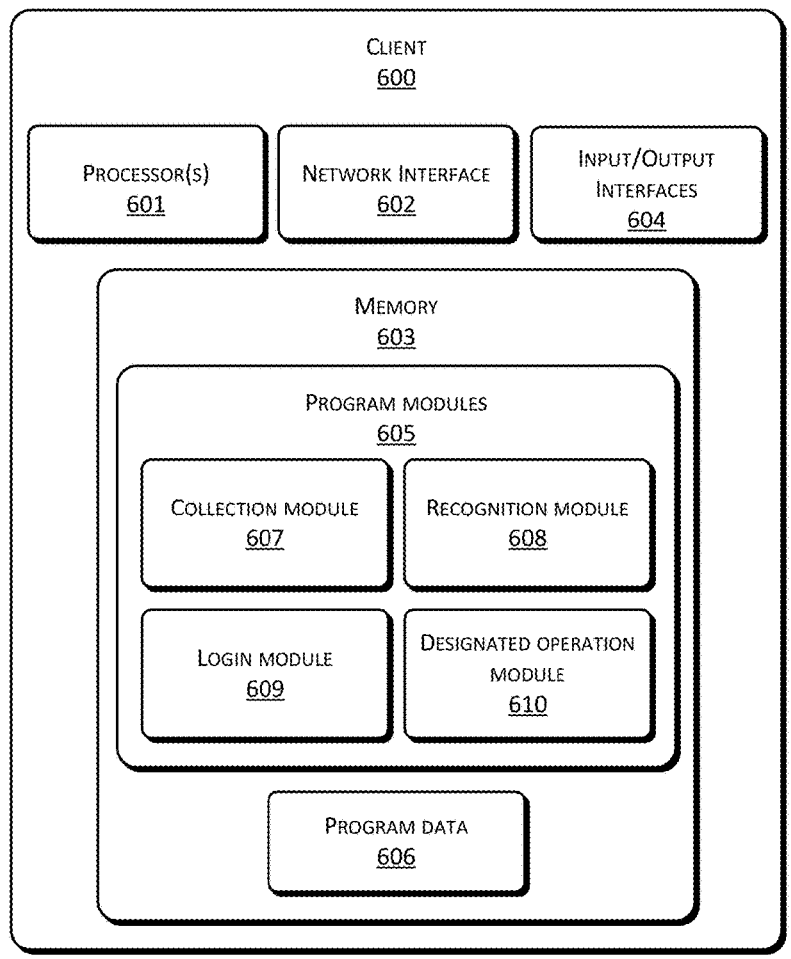
FIG. 6 is a structural diagram illustrating an example client in accordance with the embodiments of the present disclosure.

FIG. 6 illustrates an example client 600, such as the client as described above, in more detail. In an embodiment, the client 600 can include, but is not limited to, one or more processors 601, a network interface 602, memory 603, and an input/output interface 604.

The memory 603 may include computer-readable media in the form of volatile memory, such as random-access memory (RAM) and/or non-volatile memory, such as read only memory (ROM) or flash RAM. The memory 603 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 603 may include program modules 605 and program data 606. In one embodiment, the program modules 605 may include a collection module 607, a recognition module 608, a login module 609 and a designated operation module 610. Details about these program modules may be found in the foregoing embodiments described above.

Figure 7:
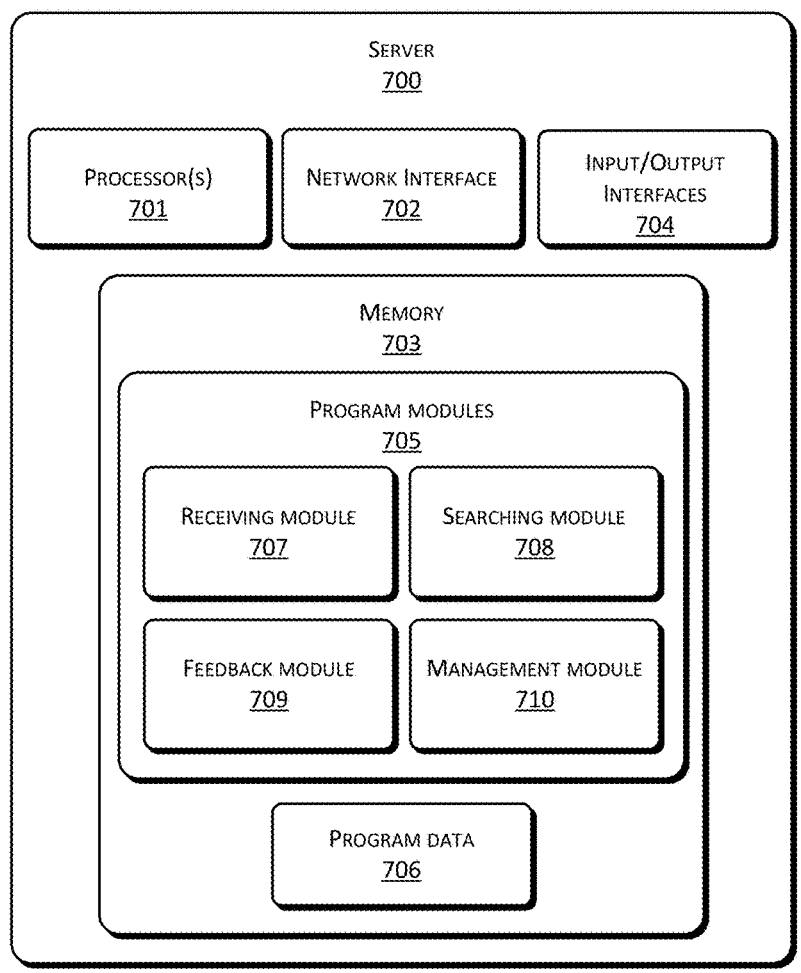
FIG. 7 is a structural diagram illustrating an example server in accordance with the embodiments of the present disclosure.

FIG. 7 illustrates an example server 700, such as the server as described above, in more detail. In an embodiment, the server 700 can include, but is not limited to, one or more processors 701, a network interface 702, memory 703, and an input/output interface 704.

The memory 703 may include computer-readable media in the form of volatile memory, such as random-access memory (RAM) and/or non-volatile memory, such as read only memory (ROM) or flash RAM. The memory 703 is an example of computer-readable media.

The memory 703 may include program modules 705 and program data 706. In one embodiment, the program modules 705 may include a receiving module 707, a searching module 708, a feedback module 709 and a management module 710. Details about these program modules may be found in the foregoing embodiments described above.

The embodiments of the present disclosure provide a method and an apparatus of account login. A client of the method captures an image of a first credential of a user, recognizes user information of the user that is included in the captured image, includes the recognized user information into a login request, and sends the login request to a server for logging into an account that corresponds to the user information. Through this method, a user does not need to input his/her username when using a client for account login, but perform the account login by directly capturing an image of a first credential using an image capturing device of the client, thus effectively improving the efficiency of account login.

One skilled in the art should understand that the embodiments of the present disclosure may be implemented as methods, systems, or products of computer software. Therefore, the present disclosure may be implemented in forms of hardware, software, or a combination of hardware and software. Further, the present disclosure may be implemented in the form of products of computer software executable on one or more computer readable storage media (including but not limited to disk storage device, CD-ROM, optical storage device, etc.) that include computer readable program instructions.

The present disclosure is described in accordance with flowcharts and/or block diagrams of the exemplary methods, apparatuses (systems) and computer program products. It should be understood that each process and/or block and combinations of the processes and/or blocks of the flowcharts and/or the block diagrams may be implemented in the form of computer program instructions. Such computer program instructions may be provided to a general purpose computer, a special purpose computer, an embedded processor or another processing apparatus having a programmable data processing device to generate a machine, so that an apparatus having the functions indicated in one or more blocks described in one or more processes of the flowcharts and/or one or more blocks of the block diagrams may be implemented by executing the instructions by the computer or the other processing apparatus having programmable data processing device.

Such computer program instructions may also be stored in a computer readable memory device which may cause a computer or another programmable data processing apparatus to function in a specific manner, so that a manufacture including an instruction apparatus may be built based on the instructions stored in the computer readable memory device. That instruction device implements functions indicated by one or more processes of the flowcharts and/or one or more blocks of the block diagrams.

The computer program instructions may also be loaded into a computer or another programmable data processing apparatus, so that a series of operations may be executed by the computer or the other data processing apparatus to generate computer implemented processing. Therefore, the instructions executed by the computer or the other programmable apparatus may be used to implement one or more processes of the flowcharts and/or one or more blocks of the block diagrams.

Although exemplary embodiments of the present disclosure are provided, one skilled in the art may change and modify theses exemplary embodiments upon understanding the underlying inventive concepts thereof. Therefore, claims attached herein are intended to cover the exemplary embodiments and all the changes and modifications that fall into the scope of the present disclosure.

One skilled in the art may make changes and modifications of the present application without departing from the spirit and scope of the present disclosure. If these changes and modifications are within the scope of the claims and their equivalents of the present disclosure, the present disclosure intends to covers such changes and modifications.

The invention claimed is:

1. A method of account login, the method comprising:
   capturing, by a client, an image of a first credential of a user, the image of the first credential being at least one of a front side or a back side of a physical card including identification information of the user thereon;

recognizing, by the client, the user identification information that is included in the captured image of the card;

including the recognized user identification information into a login request for sending to a server to enable logging into an account that corresponds to the user identification information;

capturing, by the client, an image of a second credential of the user when the user performs a password reset operation;

recognizing, by the client, verification information that is included in the captured image of the second credential; and including the user identification information recognized from the image of the first credential and the verification information recognized from the image of the second credential in a request message corresponding to the password reset operation for sending to the server.

2. The method of claim 1, wherein the image of the first credential of the user depicts an identification card of the user, and wherein the recognizing the user identification information that is included in the captured image of the card includes recognizing at least one of a name and an identification card number that are depicted in the captured image of the card.

3. The method of claim 1, further comprising including a password entered by the user into the login request for sending to the server.

4. The method of claim 3, wherein the logging into the account that corresponds to the user identification information comprises logging into the account that corresponds to the user identification information upon successful authentication by the server based on the user identification information and the password included in the login request, and wherein the server stores a correspondence relationship between the user identification information and the account, and an associated password used for each account.

5. The method of claim 1, further comprising performing a related procedure corresponding to the password reset operation upon successful authentication by the server based on the user identification information and the verification information included in the request message.

6. The method of claim 1, wherein the image of the second credential of the user comprises an image of a bank card of the user, and wherein the recognizing, by the client, verification information that is included in the captured image of the second credential comprises recognizing bank card number information included in the captured image of the second credential.

7. One or more non-transitory computer-readable media storing executable instructions that, when executed by one or more processors, cause the one or more processors to perform acts comprising:

receiving, by a server, a login request that includes user identification information from a client, the user identification information including user identification information recognized from an image of a first credential of a user that is captured by the client, and the image of the first credential being at least one of a front side or a back side of a physical card including identification information of the user thereon;

searching, by the server, for an account that corresponds to the user identification information based on:

the user identification information contained in the login request and a stored correspondence relationship between the user identification information and the account;

responding, by the server, to the login request to enable the client to log into the account corresponding to the user identification information;

receiving, by the server, an image of a second credential of the user from the client when the user performs a password reset operation;

receiving, by the server, verification information, recognized by the client, that is included in the captured image of the second credential; and receiving, by the server, a request message corresponding to the password reset operation, the request message including the user identification information recognized from the image of the first credential and the verification information recognized from the image of the second credential.

8. The one or more non-transitory computer-readable media of claim 7, wherein the login request further includes a password entered by the user through the client.

9. The one or more non-transitory computer-readable media of claim 8, the acts further comprising, prior to responding to the login request:

determining a stored password used for the account corresponding to the user identification information; and determining whether the password included in the login request matches the stored password used for the account corresponding to the user identification information.

10. The one or more non-transitory computer-readable media of claim 7, the acts further comprising the server storing a password used for the account corresponding to the user identification information and a correspondence relationship between the user identification information and the account.

11. The one or more non-transitory computer-readable media of claim 10, wherein the storing comprises:

receiving, by the server, a registration request that includes the user identification information and the password from the client; and assigning the account for the user identification information included in the registration request;

creating and storing a correspondence relationship between the user identification information included in the registration request and the assigned account; and storing the password included in the registration request as a password used for the assigned account.

12. The one or more non-transitory computer-readable media of claim 7, wherein the verification information that is included in the captured image of the second credential includes bank card number information included in the captured image of the second credential.

13. A computing device for account login including one or more modules configured to perform operations comprising:

capturing, by a client, an image of a first credential of a user, the image of the first credential being at least one of a front side or a back side of a physical card including identification information of the user thereon;

recognizing, by the client, the user identification information that is contained in the captured image of the card;

including the recognized user identification information into a login request;

sending the login request to a server for logging into an account that corresponds to the user identification information;

capturing, by the client, an image of a second credential of the user when the user performs a password reset operation;

recognizing, by the client, verification information that is included in the captured image of the second credential; and including the user identification information recognized from the image of the first credential and the verification information recognized from the image of the second credential in a request message corresponding to the password reset operation for sending to the server.

14. The computing device of claim 13, wherein the first credential of the user comprises an identification card, a passport, a driving license, or a bank card.

15. The computing device of claim 13, wherein the recognizing, by the client, the user identification information includes recognizing at least one of a name and an identification card number of the user included in the captured image of the card.

16. The computing device of claim 13, wherein the including the recognized user identification information includes including a password entered by the user into the login request for sending to the server.

17. The computing device of claim 16, wherein the one or more modules are further configured to perform an operation of logging into the account that corresponds to the user identification information upon successful authentication by the server based on the user identification information and the password included in the login request.

18. The computing device of claim 17, wherein prior to performing the operation of logging into the account that corresponds to the user identification information, the one or more modules are further configured to perform an operation of sending a registration request requesting the server to create and assign the account for the user identification information.

19. The computing device of claim 18, wherein the registration request comprises the user identification information and the password.

20. The computing device of claim 13, wherein the recognizing, by the client, verification information that is included in the captured image of the second credential comprises recognizing bank card number information included in the captured image of the second credential.

* * * * *